United States Patent
Schubert et al.

(10) Patent No.: US 8,563,464 B2
(45) Date of Patent: Oct. 22, 2013

(54) USE OF POROUS METAL-ORGANIC FRAMEWORK MATERIALS FOR COLOR MARKING OF FILTERS

(75) Inventors: Markus Schubert, Ludwigshafen (DE); Ulrich Mueller, Neustadt (DE); Christoph Kiener, Weisenheim am Sand (DE); Marcus Guzmann, Muehlhausen (DE); Juergen Huff, Ludwigshafen (DE); Joerg Pastre, Bensheim (DE)

(73) Assignee: BASF SE, Ludwigshafen (DE)

( * ) Notice: Subject to any disclaimer, the term of this patent is extended or adjusted under 35 U.S.C. 154(b) by 383 days.

(21) Appl. No.: 12/521,337

(22) PCT Filed: Dec. 17, 2007

(86) PCT No.: PCT/EP2007/064046
§ 371 (c)(1),
(2), (4) Date: Jun. 26, 2009

(87) PCT Pub. No.: WO2008/080813
PCT Pub. Date: Jul. 10, 2008

(65) Prior Publication Data
US 2010/0331176 A1 Dec. 30, 2010

(30) Foreign Application Priority Data
Dec. 27, 2006 (DE) .......................... 10 2006 061 587

(51) Int. Cl.
*B01J 20/22* (2006.01)
*B01D 46/00* (2006.01)
*C25B 3/12* (2006.01)

(52) U.S. Cl.
USPC .............................. 502/401; 95/273; 205/457

(58) Field of Classification Search
None
See application file for complete search history.

(56) References Cited

U.S. PATENT DOCUMENTS

| 5,648,508 A * | 7/1997 | Yaghi ................................ 556/9 |
| 2005/0154222 A1 * | 7/2005 | Muller et al. ................. 556/118 |
| 2008/0190289 A1 | 8/2008 | Muller et al. |

FOREIGN PATENT DOCUMENTS

WO  2006 122920  11/2006

OTHER PUBLICATIONS

U.S. Appl. No. 12/863,339, filed Jul. 16, 2010, Schubert, et al.
U.S. Appl. No. 12/594,604, filed Oct. 5, 2009, Stein, et al.
U.S. Appl. No. 12/597,616, filed Oct. 26, 2009, Schubert, et al.
U.S. Appl. No. 12/601,022, filed Nov. 20, 2009, Schubert, et al.
U.S. Appl. No. 12/600,539, filed Nov. 17, 2009, Schubert, et al.
Moorthy, J. Narasimha et al., "Anion-driven self-assembly of tetrapyridyl ligand with a twist", Journal of Molecular Structure, Elsevier, vol. 796, No. 1-3, 216-222, (2006).
Braun, Matthew E. et al., "1,4-Benzendicarboxylate derivatives as links in the design of paddle-wheel units and metal-organic frameworks", Chem. Commun., No. 24, pp. 2532-2533, XP-002474555, (2001).
Chae, Hee K. et al., "A route to high surface area, porosity and inclusion of large molecules in crystals", Letters to Nature, Nature Publishing Group, vol. 427, pp. 523-527, XP-002386278, (2004).
U.S. Appl. No. 12/668,436, filed Jan. 11, 2011, Schubert, et al.
U.S. Appl. No. 13/003,839, filed Jan. 12, 2011, Schubert, et al.

* cited by examiner

*Primary Examiner* — Patrick Ryan
*Assistant Examiner* — Sarah A Slifka
(74) *Attorney, Agent, or Firm* — Oblon, Spivak, McClelland, Maier & Neustadt, L.L.P.

(57) ABSTRACT

The present invention relates to the use of a porous metal-organic framework material comprising at least one, at least bidentate, organic compound bound to at least one metal ion by coordination, the at least one metal ion, the at least one, at least bidentate, organic compound, or if appropriate a further component, being a coloring component, as sorbent and for permanent color marking of a filter.

14 Claims, No Drawings

USE OF POROUS METAL-ORGANIC FRAMEWORK MATERIALS FOR COLOR MARKING OF FILTERS

CROSS-REFERENCE TO RELATED APPLICATIONS

This application is a 371 of PCT/EP07/064046 filed Dec. 17, 2007 and claims the benefit of DE 10 2006 061 587.5 filed Dec. 27, 2006.

The present invention relates to the use of a porous metal-organic framework material for the permanent color marking of a filter.

Filters play an important role in daily life and also in industrial processes.

In this case filters are frequently only one component of apparatuses, housings or the like. Typically, the filters are media for purifying air or exhaust air. The substances present in the air or exhaust air which are intended to be filtered out are brought into contact with the filter, the substances being correspondingly retained by adsorption.

These substances can be the most varied substances. Those of particular interest are natural pollutants and also odor substances.

The filters themselves comprise an appropriate adsorption material which has the property of adsorption of the substance to be filtered out. Familiar adsorption materials are activated carbon or zeolites.

The porous metal-organic framework materials known in the prior art are also suitable as adsorption media. For example WO-A 2006/122920 describes the removal of odor substances from gases, with metal-organic framework materials being used as sorbent.

Frequently it is necessary to mark filters by color, in order to avoid mixing up filters, to emphasize their presence, or else to match them to the color arrangement of the surroundings, such as a housing.

Typically, in this case, only components of the filter or housing are used, with color marking of the sorption medium itself being avoided, in order to avoid the adsorption properties of the sorption medium being impaired by the color marking. This mode of action restricts the possibility of color marking of filters.

There is therefore a need for providing alternative applications which make possible the color marking of filters.

One object of the present invention is therefore to provide such alternative marking possibilities.

The object is achieved by the use of a porous metal-organic framework material comprising at least one, at least bidentate, organic compound bound to at least one metal ion by coordination, the at least one metal ion, the at least one, at least bidentate, organic compound, or if appropriate a further component, being a coloring component, as sorbent and for permanent color marking of a filter.

It has in fact been found that porous metal-organic framework materials can be used as sorbents in a filter, wherein, in addition, they serve for color marking. It has been found in this case that the adsorptive property of the framework material is not, or not significantly, adversely affected.

The porous metal-organic framework material for the use according to the invention comprises at least one, at least bidentate, organic compound bound to at least one metal ion by coordination.

Such metal-organic framework materials (MOFs) are known in the prior art and are described, for example, in U.S. Pat. No. 5,648,508, EP-A-0 790 253, M. O'Keeffe et al., J. Sol. State Chem. 152 (2000), pages 3 to 20, H. Li et al., Nature 402 (1999), page 276, M. Eddaoudi et al., Topics in Catalysis 9 (1999), pages 105 to 111, B. Chen et al., Science 291 (2001), pages 1021 to 1023 and DE-A-101 11 230.

The metal-organic framework materials according to the present invention comprise pores, in particular micropores and/or mesopores. Micropores are defined as those having a diameter of 2 nm or less and mesopores are defined by a diameter in the range from 2 to 50 nm, in each case corresponding to the definition as specified in Pure & Applied Chem. 57 (1983), 603-619, in particular on page 606. The presence of micropores and/or mesopores can be studied using sorption measurements, with these measurements determining the absorption capacity of the MOFs for nitrogen at 77 Kelvin as specified in DIN 66131 and/or DIN 66134.

Preferably, the specific surface area, calculated from the Langmuir model (DIN 66131, 66134) for an MOF in powder form, is greater than 5 $m^2/g$, more preferably above 10 $m^2/g$, more preferably greater than 50 $m^2/g$, furthermore preferably greater than 500 $m^2/g$, furthermore preferably greater than 1000 $m^2/g$, and particularly preferably greater than 1500 $m^2/g$.

Shaped bodies comprising metal-organic framework materials can have a lower active surface area; preferably, however, greater than 10 $m^2/g$, more preferably greater than 50 $m^2/g$, furthermore preferably greater than 500 $m^2/g$.

The metal component in the framework material of the present invention is preferably selected from the groups Ia, IIa, IIIa, IVa to VIIIa and Ib to VIb. Particular preference is given to Mg, Ca, Sr, Ba, Sc, Y, Ln, Ti, Zr, Hf, V, Nb, Ta, Cr, Mo, W, Mn, Re, Fe, Ro, Os, Co, Rh, Ir, Ni, Pd, Pt, Cu, Ag, Au, Zn, Cd, Hg, Al, Ga, In, Tl, Si, Ge, Sn, Pb, As, Sb and Bi, wherein Ln represents lanthanoids. Lanthanoids are La, Ce, Pr, Nd, Pn, Sm, En, Gd, partial range, Dy, Ho, Er, Tm, Yb. With respect to the ions of these elements, those which may be particularly mentioned are $Mg^{2+}$, $Ca^{2+}$, $Sr^{2+}$, $Ba^{2+}$, $Sc^{3+}$, $Y^{3+}$, $Ln^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ge$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$.

More preferred metals are Zn, Cu, Al, V, Mn, Ln, Y, Sc, Mg, Zr, Ti, Fe, Co, Ni, In, Ga, Ca. Furthermore preferred metals are Al, Zn, Cu, Zr.

The expression "at least bidentate organic compound" denotes an organic compound which comprises at least one functional group which is able to form at least two coordinate bonds to one given metal ion and/or to form one coordinate bond each to two or more, preferably two, metal atoms.

Functional groups which may be mentioned, via which said coordinate bonds can be formed are, in particular, for example, the following functional groups: —$CO_2H$, —$CS_2H$, —$NO_2$, —$B(OH)_2$, —$SO_3H$, —$Si(OH)_3$, —$Ge(OH)_3$, —$Sn(OH)_3$, —$Si(SH)_4$, —$Ge(SH)_4$, —$Sn(SH)_3$, —$PO_3H$, —$AsO_3H$, —$AsO_4H$, —$P(SH)_3$, —$As(SH)_3$, —$CH(RSH)_2$, —$C(RSH)_3$, —$CH(RNH_2)_2$, —$C(RNH_2)_3$, —$CH(ROH)_2$, —$C(ROH)_3$, —$CH(RCN)_2$, —$C(RCN)_3$, wherein R, for example, can preferably be an alkylene group having 1, 2, 3, 4 or 5 carbon atoms such as, for example, a methylene, ethylene, n-propylene, isopropylene, n-butylene, isobutylene, tert-butylene or n-pentylene group, or an aryl group comprising 1 or 2 aromatic nuclei such as, for example, 2 $C_6$ rings which, if appropriate, can be condensed, and independently of one another each of which can be suitably substituted with at least one substituent, and/or each of which, independently of one another, can comprise at least one heteroatom such as, for example, N, O and/or S. According to likewise preferred embodiments, functional groups may be mentioned in which the abovementioned radical R is not present. In this respect, mention may be made, inter alia, of —CH(SH)$_2$, —C(SH)$_3$, —CH(NH$_2$)$_2$, —C(NH$_2$)$_3$, —CH(OH)$_2$, —C(OH)$_3$, —CH(CN)$_2$ or —C(CN)$_3$.

The at least two functional groups can in principle be bound to any suitable organic compound, provided that it is ensured that the organic compound having these functional groups is capable of forming the coordinate bond and for producing the framework material.

Preferably, the organic compounds which comprise the at least two functional groups are derived from a saturated or unsaturated aliphatic compound, or an aromatic compound, or a both aliphatic and aromatic compound.

The aliphatic compound or the aliphatic part of the both aliphatic and aromatic compound can be linear and/or branched and/or cyclic, with a plurality of cycles per compound also being possible. Further preferably, the aliphatic compound or the aliphatic part of the both aliphatic and aromatic compound comprises 1 to 15, further preferably 1 to 14, further preferably 1 to 13, further preferably 1 to 12, further preferably 1 to 11, and particularly preferably 1 to 10, carbon atoms such as, for example, 1, 2, 3, 4, 5, 6, 7, 8, 9 or 10 carbon atoms. Particular preference in this case is given, inter alia, to methane, adamantane, acetylene, ethylene or butadiene.

The aromatic compound or the aromatic part of the both aromatic and aliphatic compound can have one, or else a plurality, of nuclei such as, for example, two, three, four, or five nuclei, wherein the nuclei can be present separately from one another and/or at least two nuclei can be present in condensed form. Particularly preferably, the aromatic compound or the aromatic part of the both aliphatic and aromatic compound has one, two or three nuclei, one or two nuclei being particularly preferred. Independently of one another, in addition, each nucleus of said compound can comprise at least one heteroatom such as, for example, N, O, S, B, P, Si, Al, preferably N, O and/or S. Further preferably, the aromatic compound or the aromatic part of the both aromatic and aliphatic compound comprises one or two C$_6$ nuclei, wherein the two are either present separately from one another or in condensed form. In particular, aromatic compounds which may be mentioned are benzene, naphthalene and/or biphenyl and/or bipyridyl and/or pyridyl.

More preferably, the at least bidentate organic compound is an aliphatic or aromatic, acyclic or cyclic hydrocarbon having 1 to 18, preferably 1 to 10, and in particular 6, carbon atoms which, in addition, has only 2, 3 or 4 carboxyl groups as functional groups.

For example, the at least bidentate organic compound is derived from a dicarboxylic acid such as oxalic acid, succinic acid, tartaric acid, 1,4-butanedicarboxylic acid, 1,4-butenedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecane-dicarboxylic acid, heptadecanedicarboxylic acid, acetylenedicarboxylic acid, 1,2-benzenedicarboxylic acid, 1,3-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenyl-methane-3,3'-dicarboxylic acid, quinoline-3,4-dicarboxylic acid, 7-chloro-4-hydroxy-quinoline-2,8-dicarboxylic acid, diimidedicarboxylic acid, pyridine-2,6-dicarboxylic acid, 2-methylimidazole-4,5-dicarboxylic acid, thiophene-3,4-dicarboxylic acid, 2-isopropyl-imidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octadicarboxylic acid, pentane-3,3-carboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,4-bis(phenylamino)benzene-2,5-dicarboxylic acid, 1,1'-binaphthyldicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-di-carboxylic acid, 1,4,5,6,7,7-hexachloro-5-norbornene-2,3-dicarboxylic acid, phenyl-indanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoyl-benzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxa-undecanedicarboxylic acid, hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, (bis(4-aminophenyl)ether)diimidedicarboxylic acid, 4,4'-diaminodiphenylmethanediimidedicarboxylic acid, (bis(4-aminophenyl) sulfone) -diimidedicarboxylic acid, 1,4-naphthalenedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4"-dicarboxylic acid, (diphenyl ether)-4,4'-dicarboxylic acid, imidazole-4,5-dicarboxylic acid, 4(1H)-oxothiochromene-2,8-30 dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzenedicarboxylic acid, 2,5-dihydroxy-1,4-dicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridine-dicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydronorbornane-2,3-dicarboxylic acid, 5-ethyl-2,3-pyridinedicarboxylic acid or camphordicarboxylic acid.

The at least bidentate organic compound is more preferably one of the dicarboxylic acids mentioned by way of example above as such.

For example, the at least bidentate organic compound can be derived from a tricarboxylic acid such as 2-hydroxy-1,2,3-propanetricarboxylic acid, 7-chloro-2,3,8-quinolinetricarboxylic acid, 1,2,3-, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid.

The at least bidentate organic compound is more preferably one of the tricarboxylic acids mentioned by way of example above as such.

Examples of an at least bidentate organic compound derived from a tetracarboxylic acid are 1,1-dioxidoperylo[1,12-BCD]thiophene-3,4,9,10-tetracarboxylic acid, perylenetetra-carboxylic acids such as perylene-3,4,9,10-tetracarboxylic acid or (perylene 1,12-sulfone)-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetra-carboxylic acid, 1,2,4,5-benzenetetracarboxylic acid, 1,2,11,12-dodecanetetra-carboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzo-phenonetetracarboxylic acid, 3,3',4,4'-benzophenonetetracarboxylic acid, tetrahydro-furantetracarboxylic acid or cyclopentanetetracarboxylic acids such as cyclopentane-1,2,3,4-tetracarboxylic acid.

The at least bidentate organic compound is more preferably one of the tetracarboxylic acids mentioned by way of example above as such.

Very particular preference is given to using optionally at least monosubstituted aromatic dicarboxylic, tricarboxylic or tetracarboxylic acids which have one, two, three, four or more rings and in which each of the rings can comprise at least one heteroatom, with two or more rings being able to comprise identical or different heteroatoms. For example, preference is given to one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and/or four-ring tetracarboxylic acids. Suitable heteroatoms are, for example, N, O, S, B, P, and preferred heteroatoms here are N, S and/or O, Suitable substituents which may be mentioned in this respect are, inter alia, —OH, a nitro group, an amino group or an alkyl or alkoxy group.

Particular preference is given to using imidazolates such as 2-methylimidazolate, acetylenedicarboxylic acid (ADC), camphordicarboxylic acid, fumaric acid, succinic acid, benzenedicarboxylic acids such as phthalic acid, isophthalic acid, terephthalic acid (BDC), aminoterephthalic acid, triethylenediamine (TEDA), naphthalenedicarboxylic acids (NDC), biphenyldicarboxylic acids such as 4,4'-biphenyldicarboxylic acid (BPDC), pyrazinedicarboxylic acids such as 2,5-pyrazinedicarboxylic acid, bipyridinedicarboxylic acids such as 2,2'-bipyridinedicarboxylic acids such as 2,2'-bipyridine-5,5'-dicarboxylic acid, benzenetricarboxylic acids such as 1,2,3-, 1,2,4-benzenetricarboxylic acid or 1,3,5-benzenetricarboxylic acid (BTC), benzenetetracarboxylic acid, adamantane-tetracarboxylic acid (ATC), adamantanedibenzoate (ADB), benzenetribenzoate (BTB), methanetetrabenzoate (MTB), adamantanetetrabenzoate or dihydroxyterephthalic acids such as 2,5-dihydroxyterephthalic acid (DHBDC) as at least bidentate organic compounds.

Very particular preference is given to, inter alia, phthalic acid, isophthalic acid, terephthalic acid, 2,6-naphthalenedicarboxylic acid, 1,4-naphthalenedicarboxylic acid, 1,5-naphthalenedicarboxylic acid, 1,2,3-benzenetricarboxylic acid, 1,2,4-benzene-tricarboxylic acid, 1,3,5-benzenetricarboxylic acid, 1,2,4,5-benzenetetracarboxylic acid, aminoBDC, TEDA, fumaric acid, 2-methylimidazolate, biphenyldicarboxylate.

In addition to these at least bidentate organic compounds, the metal-organic framework material can further comprise one or more monodentate ligands and/or one or more at least bidentate ligands which are not derived from a dicarboxylic, tricarboxylic or tetracarboxylic acid.

In addition to these at least bidentate organic compounds, the MOF can further comprise one or more monodentate ligands.

Suitable solvents for preparing the MOFs are, inter alia, ethanol, dimethylformamide, toluene, methanol, chlorobenzene, diethylformamide, dimethyl sulfoxide, water, hydrogen peroxide, methylamine, sodium hydroxide solution, n-methylpolidone ether, acetonitrile, benzyl chloride, triethylamine, ethylene glycol and mixtures thereof. Further metal ions, at least bidentate organic compounds and solvents for preparing MOFs are described, inter alia, in U.S. Pat. No. 5,648,508 or DE-A 101 11 230.

The pore size of the metal-organic framework material can be controlled by selection of the appropriate ligand and/or the at least bidentate organic compound. In general, the larger the organic compound, the larger the pore size. The pore size is preferably from 0.2 nm to 30 nm, particularly preferably in the range from 0.3 nm to 3 nm, based on the crystalline material.

However, larger pores whose size distribution can vary also occur in a shaped body comprising a metal-organic framework material. However, preference is given to more than 50% of the total pore volume, in particular more than 75%, being made up by pores having a pore diameter of up to 1000 nm. However, a large part of the pore volume is preferably made up by pores having two diameter ranges. It is therefore more preferred for more than 25% of the total pore volume, in particular more than 50% of the total pore volume, to be made up by pores which are in a diameter range from 100 nm to 800 nm and for more than 15% of the total pore volume, in particular more than 25% of the total pore volume, to be made up by pores which are in a diameter range up to 10 nm. The pore distribution can be determined by means of mercury porosimetry.

Examples of metal-organic framework materials are given below. In addition to the designation of the framework material, the metal and the at least bidentate ligand, the solvent and the cell parameters (angles $\alpha$, $\beta$ and $\gamma$ and the dimensions A, B and C in Å) are also indicated. The latter were determined by X-ray diffraction.

| MOF-n | Constituents molar ratio M + L | Solvents | α | β | γ | a | b | c | Space group |
|---|---|---|---|---|---|---|---|---|---|
| MOF-0 | Zn(NO₃)₂·6H₂O H₃(BTC) | ethanol | 90 | 90 | 120 | 16.711 | 16.711 | 14.189 | P6(3)/Mcm |
| MOF-2 | Zn(NO₃)₂·6H₂O (0.246 mmol) H₂(BDC) 0.241 mmol | DMF toluene | 90 | 102.8 | 90 | 6.718 | 15.49 | 12.43 | P2(1)/n |
| MOF-3 | Zn(NO₃)₂·6H₂O (1.89 mmol) H₂(BDC) (1.93 mmol) | DMF MeOH | 99.72 | 111.11 | 108.4 | 9.726 | 9.911 | 10.45 | P-1 |
| MOF-4 | Zn(NO₃)₂·6H₂O (1.00 mmol) H₃(BTC) (0.5 mmol) | ethanol | 90 | 90 | 90 | 14.728 | 14.728 | 14.728 | P2(1)3 |
| MOF-5 | Zn(NO₃)₂·6H₂O (2.22 mmol) H₂(BDC) (2.17 mmol) | DMF chlorobenzene | 90 | 90 | 90 | 25.669 | 25.669 | 25.669 | Fm-3m |
| MOF-38 | Zn(NO₃)₂·6H₂O (0.27 mmol) H₃(BTC) (0.15 mmol) | DMF chlorobenzene | 90 | 90 | 90 | 20.657 | 20.657 | 17.84 | I4cm |
| MOF-31 Zn(ADC)₂ | Zn(NO₃)₂·6H₂O 0.4 mmol H₂(ADC) 0.8 mmol | ethanol | 90 | 90 | 90 | 10.821 | 10.821 | 10.821 | Pn(-3)m |
| MOF-12 Zn₂(ATC) | Zn(NO₃)₂·6H₂O 0.3 mmol H₄(ATC) 0.15 mmol | ethanol | 90 | 90 | 90 | 15.745 | 16.907 | 18.167 | Pbca |
| MOF-20 ZnNDC | Zn(NO₃)₂·6H₂O 0.37 mmol H₂NDC 0.36 mmol | DMF chlorobenzene | 90 | 92.13 | 90 | 8.13 | 16.444 | 12.807 | P2(1)/c |
| MOF-37 | Zn(NO₃)₂·6H₂O 0.2 mmol H₂NDC 0.2 mmol | DEF chlorobenzene | 72.38 | 83.16 | 84.33 | 9.952 | 11.576 | 15.556 | P-1 |
| MOF-8 Tb₂(ADC) | Tb(NO₃)₃·5H₂O 0.10 mmol H₂ADC 0.20 mmol | DMSO MeOH | 90 | 115.7 | 90 | 19.83 | 9.822 | 19.183 | C2/c |
| MOF-9 Tb₂(ADC) | Tb(NO₃)₃·5H₂O 0.08 mmol H₂ADB 0.12 mmol | DMSO | 90 | 102.09 | 90 | 27.056 | 16.795 | 28.139 | C2/c |
| MOF-6 | Tb(NO₃)₃·5H₂O 0.30 mmol H₂(BDC) 0.30 mmol | DMF MeOH | 90 | 91.28 | 90 | 17.599 | 19.996 | 10.545 | P21/c |
| MOF-7 | Tb(NO₃)₃·5H₂O 0.15 mmol H₂(BDC) 0.15 mmol | H₂O | 102.3 | 91.12 | 101.5 | 6.142 | 10.069 | 10.096 | P-1 |
| MOF-69A | Zn(NO₃)₂·6H₂O 0.083 mmol 4,4'BPDC 0.041 mmol | DEF H₂O₂ MeNH₂ | 90 | 111.6 | 90 | 23.12 | 20.92 | 12 | C2/c |
| MOF-69B | Zn(NO₃)₂·6H₂O 0.083 mmol 2,6-NCD 0.041 mmol | DEF H₂O₂ MeNH₂ | 90 | 95.3 | 90 | 20.17 | 18.55 | 12.16 | C2/c |
| MOF-11 Cu₂(ATC) | Cu(NO₃)₂·2.5H₂O 0.47 mmol H₂ATC 0.22 mmol | H₂O | 90 | 93.86 | 90 | 12.987 | 11.22 | 11.336 | C2/c |
| MOF-11 Cu₂(ATC) dehydr. | | | 90 | 90 | 90 | 8.4671 | 8.4671 | 14.44 | P42/mmc |

-continued

| MOF-n | Constituents molar ratio M + L | Solvents | α | β | γ | a | b | c | Space group |
|---|---|---|---|---|---|---|---|---|---|
| MOF-14 Cu₃(BTB) | Cu(NO₃)₂·2.5H₂O 0.28 mmol H₃BTB 0.052 mmol | H₂O DMF EtOH | 90 | 90 | 90 | 26.946 | 26.946 | 26.946 | Im-3 |
| MOF-32 Cd(ATC) | Cd(NO₃)₂·4H₂O 0.24 mmol H₄ATC 0.10 mmol | H₂O NaOH | 90 | 90 | 90 | 13.468 | 13.468 | 13.468 | P(-4)3m |
| MOF-33 Zn₂(ATB) | ZnCl₂ 0.15 mmol H₄ATB 0.02 mmol | H₂O DMF EtOH | 90 | 90 | 90 | 19.561 | 15.255 | 23.404 | Imma |
| MOF-34 Ni(ATC) | Ni(NO₃)₂·6H₂O 0.24 mmol H₄ATC 0.10 mmol | H₂O NaOH | 90 | 90 | 90 | 10.066 | 11.163 | 19.201 | P2₁2₁2₁ |
| MOF-36 Zn₂(MTB) | Zn(NO₃)₂·4H₂O 0.20 mmol H₄MTB 0.04 mmol | H₂O DMF | 90 | 90 | 90 | 15.745 | 16.907 | 18.167 | Pbca |
| MOF-39 Zn₃O(HBTB) | Zn(NO₃)₂·4H₂O 0.27 mmol H₃BTB 0.07 mmol | H₂O DMF EtOH | 90 | 90 | 90 | 17.158 | 21.591 | 25.308 | Pnma |
| NO305 | FeCl₂·4H₂O 5.03 mmol formic acid 86.90 mmol | DMF | 90 | 90 | 120 | 8.2692 | 8.2692 | 63.566 | R-3c |
| NO306A | FeCl₂·4H₂O 5.03 mmol formic acid 86.90 mmol | DEF | 90 | 90 | 90 | 9.9364 | 18.374 | 18.374 | Pbcn |
| NO29 MOF-0 similar | Mn(Ac)₂·4H₂O 0.46 mmol H₃BTC 0.69 mmol | DMF | 120 | 90 | 90 | 14.16 | 33.521 | 33.521 | P-1 |
| BPR48 A2 | Zn(NO₃)₂6H₂O 0.012 mmol H₂BDC 0.012 mmol | DMSO toluene | 90 | 90 | 90 | 14.5 | 17.04 | 18.02 | Pbca |
| BPR69 B1 | Cd(NO₃)₂4H₂O 0.0212 mmol H₂BDC 0.0428 mmol | DMSO | 90 | 98.76 | 90 | 14.16 | 15.72 | 17.66 | Cc |
| BPR92 A2 | Co(NO₃)₂·6H₂O 0.018 mmol H₂BDC 0.018 mmol | NMP | 106.3 | 107.63 | 107.2 | 7.5308 | 10.942 | 11.025 | P1 |
| BPR95 C5 | Cd(NO₃)₂4H₂O 0.012 mmol H₂BDC 0.36 mmol | NMP | 90 | 112.8 | 90 | 14.460 | 11.085 | 15.829 | P2(1)/n |
| Cu C₆H₄O₆ | Cu(NO₃)₂·2.5H₂O 0.370 mmol H₂BDC(OH)₂ 0.37 mmol | DMF chlorobenzene | 90 | 105.29 | 90 | 15.259 | 14.816 | 14.13 | P2(1)/c |
| M(BTC) MOF-0 similar | Co(SO₄)H₂O 0.055 mmol H₃BTC 0.037 mmol | DMF | | as for MOF-0 | | | | | |
| Tb(C₆H₄O₆) | Tb(NO₃)₃·5H₂O 0.370 mmol H₂(C₆H₄O₆) 0.56 mmol | DMF chlorobenzene | 104.6 | 107.9 | 97.147 | 10.491 | 10.981 | 12.541 | P-1 |
| Zn(C₂O₄) | ZnCl₂ 0.370 mmol oxalic acid 0.37 mmol | DMF chlorobenzene | 90 | 120 | 90 | 9.4168 | 9.4168 | 8.464 | P(-3)1m |
| Co(CHO) | Co(NO₃)₂·5H₂O 0.043 mmol formic acid 1.60 mmol | DMF | 90 | 91.32 | 90 | 11.328 | 10.049 | 14.854 | P2(1)/n |
| Cd(CHO) | Cd(NO₃)₂·4H₂O 0.185 mmol formic acid 0.185 mmol | DMF | 90 | 120 | 90 | 8.5168 | 8.5168 | 22.674 | R-3c |

-continued

| MOF-n | Constituents molar ratio M + L | Solvents | α | β | γ | a | b | c | Space group |
|---|---|---|---|---|---|---|---|---|---|
| Cu(C$_3$H$_2$O$_4$) | Cu(NO$_3$)$_2$·2.5H$_2$O 0.043 mmol malonic acid 0.192 mmol | DMF | 90 | 90 | 90 | 8.366 | 8.366 | 11.919 | P43 |
| Zn$_6$(NDC)$_5$ MOF-48 | Zn(NO$_3$)$_2$·6H$_2$O 0.097 mmol 14 NDC 0.069 mmol | DMF chloro-benzene H$_2$O$_2$ | 90 | 95.902 | 90 | 19.504 | 16.482 | 14.64 | C2/m |
| MOF-47 | Zn(NO$_3$)$_2$6H$_2$O 0.185 mmol H$_2$(BDC[CH$_3$]$_4$) 0.185 mmol | DMF chloro-benzene H$_2$O$_2$ | 90 | 92.55 | 90 | 11.303 | 16.029 | 17.535 | P2(1)/c |
| MO25 | Cu(NO$_3$)$_2$·2.5H$_2$O 0.084 mmol BPhDC 0.085 mmol | DMF | 90 | 112.0 | 90 | 23.880 | 16.834 | 18.389 | P2(1)/c |
| Cu-Thio | Cu(NO$_3$)$_2$·2.5H$_2$O 0.084 mmol thiophenedi-carboxylic acid 0.085 mmol | DEF | 90 | 113.6 | 90 | 15.4747 | 14.514 | 14.032 | P2(1)/c |
| ClBDC1 | Cu(NO$_3$)$_2$·2.5H$_2$O 0.084 mmol H$_2$(BDCCl$_2$) 0.085 mmol | DMF | 90 | 105.6 | 90 | 14.911 | 15.622 | 18.413 | C2/c |
| MOF-101 | Cu(NO$_3$)$_2$·2.5H$_2$O 0.084 mmol BrBDC 0.085 mmol | DMF | 90 | 90 | 90 | 21.607 | 20.607 | 20.073 | Fm3m |
| Zn$_3$(BTC)$_2$ | ZnCl$_2$ 0.033 mmol H$_3$BTC 0.033 mmol | DMF EtOH base added | 90 | 90 | 90 | 26.572 | 26.572 | 26.572 | Fm-3m |
| MOF-j | Co(CH$_3$CO$_2$)$_2$·4H$_2$O (1.65 mmol) H$_3$(BZC) (0.95 mmol) | H$_2$O | 90 | 112.0 | 90 | 17.482 | 12.963 | 6.559 | C2 |
| MOF-n | Zn(NO$_3$)$_2$·6H$_2$O H$_3$(BTC) | ethanol | 90 | 90 | 120 | 16.711 | 16.711 | 14.189 | P6(3)/mcm |
| PbBDC | Pb(NO$_3$)$_2$ (0.181 mmol) H$_2$(BDC) (0.181 mmol) | DMF ethanol | 90 | 102.7 | 90 | 8.3639 | 17.991 | 9.9617 | P2(1)/n |
| Znhex | Zn(NO$_3$)$_2$·6H$_2$O (0.171 mmol) H$_3$BTB (0.114 mmol) | DMF p-xylene ethanol | 90 | 90 | 120 | 37.1165 | 37.117 | 30.019 | P3(1)c |
| AS16 | FeBr$_2$ 0.927 mmol H$_2$(BDC) 0.927 mmol | DMF anhydr. | 90 | 90.13 | 90 | 7.2595 | 8.7894 | 19.484 | P2(1)c |
| AS27-2 | FeBr$_2$ 0.927 mmol H$_3$(BDC) 0.464 mmol | DMF anhydr. | 90 | 90 | 90 | 26.735 | 26.735 | 26.735 | Fm3m |
| AS32 | FeCl$_3$ 1.23 mmol H$_2$(BDC) 1.23 mmol | DMF anhydr. ethanol | 90 | 90 | 120 | 12.535 | 12.535 | 18.479 | P6(2)c |
| AS54-3 | FeBr$_2$ 0.927 BPDC 0.927 mmol | DMF anhydr. n-propanol | 90 | 109.98 | 90 | 12.019 | 15.286 | 14.399 | C2 |
| AS61-4 | FeBr$_2$ 0.927 mmol m-BDC 0.927 mmol | pyridine anhydr. | 90 | 90 | 120 | 13.017 | 13.017 | 14.896 | P6(2)c |
| AS68-7 | FeBr$_2$ 0.927 mmol m-BDC 1.204 mmol | DMF anhydr. pyridine | 90 | 90 | 90 | 18.3407 | 10.036 | 18.039 | Pca2$_1$ |

-continued

| MOF-n | Constituents molar ratio M + L | Solvents | α | β | γ | a | b | c | Space group |
|---|---|---|---|---|---|---|---|---|---|
| Zn(ADC) | Zn(NO$_3$)$_2$•6H$_2$O 0.37 mmol H$_2$(ADC) 0.36 mmol | DMF chloro-benzene | 90 | 99.85 | 90 | 16.764 | 9.349 | 9.635 | C2/c |
| MOF-12 Zn$_2$(ATC) | Zn(NO$_3$)$_2$•6H$_2$O 0.30 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$•6H$_2$O 0.37 mmol H$_2$NDC 0.36 mmol | DMF chloro-benzene | 90 | 92.13 | 90 | 8.13 | 16.444 | 12.807 | P2(1)/c |
| MOF-37 | Zn(NO$_3$)$_2$•6H$_2$O 0.20 mmol H$_2$NDC 0.20 mmol | DEF chloro-benzene | 72.38 | 83.16 | 84.33 | 9.952 | 11.576 | 15.556 | P-1 |
| Zn(NDC) (DMSO) | Zn(NO$_3$)$_2$•6H$_2$O H$_2$NDC | DMSO | 68.08 | 75.33 | 88.31 | 8.631 | 10.207 | 13.114 | P-1 |
| Zn(NDC) | Zn(NO$_3$)$_2$•6H$_2$O H$_2$NDC | | 90 | 99.2 | 90 | 19.289 | 17.628 | 15.052 | C2/c |
| Zn(HPDC) | Zn(NO$_3$)$_2$•4H$_2$O 0.23 mmol H$_2$(HPDC) 0.05 mmol | DMF H$_2$O | 107.9 | 105.06 | 94.4 | 8.326 | 12.085 | 13.767 | P-1 |
| Co(HPDC) | Co(NO$_3$)$_2$•6H$_2$O 0.21 mmol H$_2$(HPDC) 0.06 mmol | DMF H$_2$O/ ethanol | 90 | 97.69 | 90 | 29.677 | 9.63 | 7.981 | C2/c |
| Zn$_3$(PDC)2.5 | Zn(NO$_3$)$_2$•4H$_2$O 0.17 mmol H$_2$(HPDC) 0.05 mmol | DMF/ ClBz H$_2$0/TEA | 79.34 | 80.8 | 85.83 | 8.564 | 14.046 | 26.428 | P-1 |
| Cd$_2$ (TPDC)2 | Cd(NO$_3$)$_2$•4H$_2$O 0.06 mmol H$_2$(HPDC) 0.06 mmol | methanol/ CHP H$_2$O | 70.59 | 72.75 | 87.14 | 10.102 | 14.412 | 14.964 | P-1 |
| Tb(PDC)1.5 | Tb(NO$_3$)$_3$•5H$_2$O 0.21 mmol H$_2$(PDC) 0.034 mmol | DMF H$_2$O/ ethanol | 109.8 | 103.61 | 100.14 | 9.829 | 12.11 | 14.628 | P-1 |
| ZnDBP | Zn(NO$_3$)$_2$•6H$_2$O 0.05 mmol dibenzyl-phosphate 0.10 mmol | MeOH | 90 | 93.67 | 90 | 9.254 | 10.762 | 27.93 | P2/n |
| Zn$_3$(BPDC) | ZnBr$_2$ 0.021 mmol 4,4'BPDC 0.005 mmol | DMF | 90 | 102.76 | 90 | 11.49 | 14.79 | 19.18 | P21/n |
| CdBDC | Cd(NO$_3$)$_2$•4H$_2$O 0.100 mmol H$_2$(BDC) 0.401 mmol | DMF Na$_2$SiO$_3$ (aq) | 90 | 95.85 | 90 | 11.2 | 11.11 | 16.71 | P21/n |
| Cd-mBDC | Cd(NO$_3$)$_2$•4H$_2$O 0.009 mmol H$_2$(mBDC) 0.018 mmol | DMF MeNH$_2$ | 90 | 101.1 | 90 | 13.69 | 18.25 | 14.91 | C2/c |
| Zn$_4$OBNDC | Zn(NO$_3$)$_2$•6H$_2$O 0.041 mmol BNDC | DEF MeNH$_2$H$_2$O$_2$ | 90 | 90 | 90 | 22.35 | 26.05 | 59.56 | Fmmm |
| Eu(TCA) | Eu(NO$_3$)$_3$•6H$_2$O 0.14 mmol TCA 0.026 mmol | DMF chloro-benzene | 90 | 90 | 90 | 23.325 | 23.325 | 23.325 | Pm-3n |
| Tb(TCA) | Tb(NO$_3$)$_3$•6H$_2$O 0.069 mmol TCA 0.026 mmol | DMF chloro-benzene | 90 | 90 | 90 | 23.272 | 23.272 | 23.372 | Pm-3n |
| Formate | Ce(NO$_3$)$_3$•6H$_2$O 0.138 mmol formic acid 0.43 mmol | H$_2$O ethanol | 90 | 90 | 120 | 10.668 | 10.667 | 4.107 | R-3m |
| | FeCl$_2$•4H$_2$O 5.03 mmol formic acid 86.90 mmol | DMF | 90 | 90 | 120 | 8.2692 | 8.2692 | 63.566 | R-3c |

-continued

| MOF-n | Constituents molar ratio M + L | Solvents | α | β | γ | a | b | c | Space group |
|---|---|---|---|---|---|---|---|---|---|
| | FeCl$_2$•4H$_2$O 5.03 mmol formic acid 86.90 mmol | DEF | 90 | 90 | 90 | 9.9364 | 18.374 | 18.374 | Pbcn |
| | FeCl$_2$•4H$_2$O 5.03 mmol formic acid 86.90 mmol | DEF | 90 | 90 | 90 | 8.335 | 8.335 | 13.34 | P-31c |
| NO330 | FeCl$_2$•4H$_2$O 0.50 mmol formic acid 8.69 mmol | Formamide | 90 | 90 | 90 | 8.7749 | 11.655 | 8.3297 | Pnna |
| NO332 | FeCl$_2$•4H$_2$O 0.50 mmol formic acid 8.69 mmol | DIP | 90 | 90 | 90 | 10.0313 | 18.808 | 18.355 | Pbcn |
| NO333 | FeCl$_2$•4H$_2$O 0.50 mmol formic acid 8.69 mmol | DBF | 90 | 90 | 90 | 45.2754 | 23.861 | 12.441 | Cmcm |
| NO335 | FeCl$_2$•4H$_2$O 0.50 mmol formic acid 8.69 mmol | CHF | 90 | 91.372 | 90 | 11.5964 | 10.187 | 14.945 | P21/n |
| NO336 | FeCl$_2$•4H$_2$O 0.50 mmol formic acid 8.69 mmol | MFA | 90 | 90 | 90 | 11.7945 | 48.843 | 8.4136 | Pbcm |
| NO13 | Mn(Ac)$_2$•4H$_2$O 0.46 mmol benzoic acid 0.92 mmol bipyridine 0.46 mmol | ethanol | 90 | 90 | 90 | 18.66 | 11.762 | 9.418 | Pbcn |
| NO29 MOF-0 similar | Mn(Ac)$_2$•4H$_2$O 0.46 mmol H$_3$BTC 0.69 mmol | DMF | 120 | 90 | 90 | 14.16 | 33.521 | 33.521 | P-1 |
| Mn(hfac)$_2$ (O$_2$CC$_6$H$_5$) | Mn(Ac)$_2$•4H$_2$O 0.46 mmol Hfac 0.92 mmol bipyridine 0.46 mmol | ether | 90 | 95.32 | 90 | 9.572 | 17.162 | 14.041 | C2/c |
| BPR43G2 | Zn(NO$_3$)$_2$•6H$_2$O 0.0288 mmol H$_2$BDC 0.0072 mmol | DMF CH$_3$CN | 90 | 91.37 | 90 | 17.96 | 6.38 | 7.19 | C2/c |
| BPR48A2 | Zn(NO$_3$)$_2$6H$_2$O 0.012 mmol H$_2$BDC 0.012 mmol | DMSO toluene | 90 | 90 | 90 | 14.5 | 17.04 | 18.02 | Pbca |
| BPR49B1 | Zn(NO$_3$)$_2$6H$_2$O 0.024 mmol H$_2$BDC 0.048 mmol | DMSO methanol | 90 | 91.172 | 90 | 33.181 | 9.824 | 17.884 | C2/c |
| BPR56E1 | Zn(NO$_3$)$_2$6H$_2$O 0.012 mmol H$_2$BDC 0.024 mmol | DMSO n-propanol | 90 | 90.096 | 90 | 14.5873 | 14.153 | 17.183 | P2(1)/n |
| BPR68D10 | Zn(NO$_3$)$_2$6H$_2$O 0.0016 mmol H$_3$BTC 0.0064 mmol | DMSO benzene | 90 | 95.316 | 90 | 10.0627 | 10.17 | 16.413 | P2(1)/c |
| BPR69B1 | Cd(NO$_3$)$_2$4H$_2$O 0.0212 mmol H$_2$BDC 0.0428 mmol | DMSO | 90 | 98.76 | 90 | 14.16 | 15.72 | 17.66 | Cc |
| BPR73E4 | Cd(NO$_3$)$_2$4H$_2$O 0.006 mmol H$_2$BDC 0.003 mmol | DMSO toluene | 90 | 92.324 | 90 | 8.7231 | 7.0568 | 18.438 | P2(1)/n |
| BPR76D5 | Zn(NO$_3$)$_2$6H$_2$O 0.0009 mmol H$_2$BzPDC 0.0036 mmol | DMSO | 90 | 104.17 | 90 | 14.4191 | 6.2599 | 7.0611 | Pc |

-continued

| MOF-n | Constituents molar ratio M + L | Solvents | α | β | γ | a | b | c | Space group |
|---|---|---|---|---|---|---|---|---|---|
| BPR80B5 | Cd(NO$_3$)$_2$•4H$_2$O 0.018 mmol H$_2$BDC 0.036 mmol | DMF | 90 | 115.11 | 90 | 28.049 | 9.184 | 17.837 | C2/c |
| BPR80H5 | Cd(NO$_3$)$_2$4H$_2$O 0.027 mmol H$_2$BDC 0.027 mmol | DMF | 90 | 119.06 | 90 | 11.4746 | 6.2151 | 17.268 | P2/c |
| BPR82C6 | Cd(NO$_3$)$_2$4H$_2$O 0.0068 mmol H$_2$BDC 0.202 mmol | DMF | 90 | 90 | 90 | 9.7721 | 21.142 | 27.77 | Fdd2 |
| BPR86C3 | Co(NO$_3$)$_2$6H$_2$O 0.0025 mmol H$_2$BDC 0.075 mmol | DMF | 90 | 90 | 90 | 18.3449 | 10.031 | 17.983 | Pca2(1) |
| BPR86H6 | Cd(NO$_3$)$_2$•6H$_2$O 0.010 mmol H$_2$BDC 0.010 mmol | DMF | 80.98 | 89.69 | 83.412 | 9.8752 | 10.263 | 15.362 | P-1 |
|  | Co(NO$_3$)$_2$6H$_2$O | NMP | 106.3 | 107.63 | 107.2 | 7.5308 | 10.942 | 11.025 | P1 |
| BPR95A2 | Zn(NO$_3$)$_2$6H$_2$O 0.012 mmol H$_2$BDC 0.012 mmol | NMP | 90 | 102.9 | 90 | 7.4502 | 13.767 | 12.713 | P2(1)/c |
| CuC$_6$F$_4$O$_4$ | Cu(NO$_3$)$_2$•2.5H$_2$O 0.370 mmol H$_2$BDC(OH)$_2$ 0.37 mmol | DMF chloro- benzene | 90 | 98.834 | 90 | 10.9675 | 24.43 | 22.553 | P2(1)/n |
| Fe Formic | FeCl$_2$•4H$_2$O 0.370 mmol formic acid 0.37 mmol | DMF | 90 | 91.543 | 90 | 11.495 | 9.963 | 14.48 | P2(1)/n |
| Mg Formic | Mg(NO$_3$)$_2$•6H$_2$O 0.370 mmol formic acid 0.37 mmol | DMF | 90 | 91.359 | 90 | 11.383 | 9.932 | 14.656 | P2(1)/n |
| MgC$_6$H$_4$O$_6$ | Mg(NO$_3$)$_2$•6H$_2$O 0.370 mmol H$_2$BDC(OH)$_2$ 0.37 mmol | DMF | 90 | 96.624 | 90 | 17.245 | 9.943 | 9.273 | C2/c |
| Zn C$_2$H$_4$BDC MOF-38 | ZnCl$_2$ 0.44 mmol CBBDC 0.261 mmol | DMF | 90 | 94.714 | 90 | 7.3386 | 16.834 | 12.52 | P2(1)/n |
| MOF-49 | ZnCl$_2$ 0.44 mmol m-BDC 0.261 mmol | DMF CH$_3$CN | 90 | 93.459 | 90 | 13.509 | 11.984 | 27.039 | P2/c |
| MOF-26 | Cu(NO$_3$)$_2$•5H$_2$O 0.084 mmol DCPE 0.085 mmol | DMF | 90 | 95.607 | 90 | 20.8797 | 16.017 | 26.176 | P2(1)/n |
| MOF-112 | Cu(NO$_3$)$_2$•2.5H$_2$O 0.084 mmol o-Br-m-BDC 0.085 mmol | DMF ethanol | 90 | 107.49 | 90 | 29.3241 | 21.297 | 18.069 | C2/c |
| MOF-109 | Cu(NO$_3$)$_2$•2.5H$_2$O 0.084 mmol KDB 0.085 mmol | DMF | 90 | 111.98 | 90 | 23.8801 | 16.834 | 18.389 | P2(1)/c |
| MOF-111 | Cu(NO$_3$)$_2$•2.5H$_2$O 0.084 mmol o-BrBDC 0.085 mmol | DMF ethanol | 90 | 102.16 | 90 | 10.6767 | 18.781 | 21.052 | C2/c |
| MOF-110 | Cu(NO$_3$)$_2$•2.5H$_2$O 0.084 mmol thiophene- dicarboxylic acid 0.085 mmol | DMF | 90 | 90 | 120 | 20.0652 | 20.065 | 20.747 | R-3/m |
| MOF-107 | Cu(NO$_3$)$_2$•2.5H$_2$O 0.084 mmol thiophene- dicarboxylic acid 0.085 mmol | DEF | 104.8 | 97.075 | 95.206 | 11.032 | 18.067 | 18.452 | P-1 |

-continued

| MOF-n | Constituents molar ratio M + L | Solvents | α | β | γ | a | b | c | Space group |
|---|---|---|---|---|---|---|---|---|---|
| MOF-108 | Cu(NO$_3$)$_2$·2.5H$_2$O 0.084 mmol thiophene-dicarboxylic acid 0.085 mmol | DBF/ methanol | 90 | 113.63 | 90 | 15.4747 | 14.514 | 14.032 | C2/c |
| MOF-102 | Cu(NO$_3$)$_2$·2.5H$_2$O 0.084 mmol H$_2$(BDCCl$_2$) 0.085 mmol | DMF | 91.63 | 106.24 | 112.01 | 9.3845 | 10.794 | 10.831 | P-1 |
| Clbdc1 | Cu(NO$_3$)$_2$·2.5H$_2$O 0.084 mmol H$_2$(BDCCl$_2$) 0.085 mmol | DEF | 90 | 105.56 | 90 | 14.911 | 15.622 | 18.413 | P-1 |
| Cu(NMOP) | Cu(NO$_3$)$_2$·2.5H$_2$O 0.084 mmol NBDC 0.085 mmol | DMF | 90 | 102.37 | 90 | 14.9238 | 18.727 | 15.529 | P2(1)/m |
| Tb(BTC) | Tb(NO$_3$)$_3$·5H$_2$O 0.033 mmol H$_3$BTC 0.033 mmol | DMF | 90 | 106.02 | 90 | 18.6986 | 11.368 | 19.721 | |
| Zn$_3$(BTC)$_2$ Honk | ZnCl$_2$ 0.033 mmol H$_3$BTC 0.033 mmol | DMF ethanol | 90 | 90 | 90 | 26.572 | 26.572 | 26.572 | Fm-3m |
| Zn4O(NDC) | Zn(NO3)2·4H2O 0.066 mmol 14NDC 0.066 mmol | DMF ethanol | 90 | 90 | 90 | 41.5594 | 18.818 | 17.574 | aba2 |
| CdTDC | Cd(NO3)2·4H2O 0.014 mmol thiophene 0.040 mmol DABCO 0.020 mmol | DMF H2O | 90 | 90 | 90 | 12.173 | 10.485 | 7.33 | Pmma |
| IRMOF-2 | Zn(NO3)2·4H2O 0.160 mmol o-Br-BDC 0.60 mmol | DEF | 90 | 90 | 90 | 25.772 | 25.772 | 25.772 | Fm-3m |
| IRMOF-3 | Zn(NO3)2·4H2O 0.20 mmol H2N-BDC 0.60 mmol | DEF ethanol | 90 | 90 | 90 | 25.747 | 25.747 | 25.747 | Fm-3m |
| IRMOF-4 | Zn(NO3)2·4H2O 0.11 mmol [C3H7O]2-BDC 0.48 mmol | DEF | 90 | 90 | 90 | 25.849 | 25.849 | 25.849 | Fm-3m |
| IRMOF-5 | Zn(NO3)2·4H2O 0.13 mmol [C5H11O]2-BDC 0.50 mmol | DEF | 90 | 90 | 90 | 12.882 | 12.882 | 12.882 | Pm-3m |
| IRMOF-6 | Zn(NO3)2·4H2O 0.20 mmol [C2H4]-BDC 0.60 mmol | DEF | 90 | 90 | 90 | 25.842 | 25.842 | 25.842 | Fm-3m |
| IRMOF-7 | Zn(NO3)2·4H2O 0.07 mmol 1,4NDC 0.20 mmol | DEF | 90 | 90 | 90 | 12.914 | 12.914 | 12.914 | Pm-3m |
| IRMOF-8 | Zn(NO3)2·4H2O 0.55 mmol 2,6NDC 0.42 mmol | DEF | 90 | 90 | 90 | 30.092 | 30.092 | 30.092 | Fm-3m |
| IRMOF-9 | Zn(NO3)2·4H2O 0.05 mmol BPDC 0.42 mmol | DEF | 90 | 90 | 90 | 17.147 | 23.322 | 25.255 | Pnnm |
| IRMOF-10 | Zn(NO3)2·4H2O 0.02 mmol BPDC 0.012 mmol | DEF | 90 | 90 | 90 | 34.281 | 34.281 | 34.281 | Fm-3m |
| IRMOF-11 | Zn(NO3)2·4H2O 0.05 mmol HPDC 0.20 mmol | DEF | 90 | 90 | 90 | 24.822 | 24.822 | 56.734 | R-3m |

-continued

| MOF-n | Constituents molar ratio M + L | Solvents | α | β | γ | a | b | c | Space group |
|---|---|---|---|---|---|---|---|---|---|
| IRMOF-12 | Zn(NO3)2•4H2O 0.017 mmol HPDC 0.12 mmol | DEF | 90 | 90 | 90 | 34.281 | 34.281 | 34.281 | Fm-3m |
| IRMOF-13 | $Zn(NO_3)_2 \cdot 4H_2O$ 0.048 mmol PDC 0.31 mmol | DEF | 90 | 90 | 90 | 24.822 | 24.822 | 56.734 | R-3m |
| IRMOF-14 | $Zn(NO_3)_2 \cdot 4H_2O$ 0.17 mmol PDC 0.12 mmol | DEF | 90 | 90 | 90 | 34.381 | 34.381 | 34.381 | Fm-3m |
| IRMOF-15 | $Zn(NO_3)_2 \cdot 4H_2O$ 0.063 mmol TPDC 0.025 mmol | DEF | 90 | 90 | 90 | 21.459 | 21.459 | 21.459 | Im-3m |
| IRMOF-16 | $Zn(NO_3)_2 \cdot 4H_2O$ 0.0126 mmol TPDC 0.05 mmol | DEF NMP | 90 | 90 | 90 | 21.49 | 21.49 | 21.49 | Pm-3m |

ADC Acetylenedicarboxylic acid
NDC Naphthalenedicarboxylic acid
BDC Benzenedicarboxylic acid
ATC Adamantanetetracarboxylic acid
BTC Benzenetricarboxylic acid
BTB Benzenetribenzoic acid
MTB Methanetetrabenzoic acid
ATB Adamantanetetrabenzoic acid
ADB Adamantanedibenzoic acid Further metal-organic framework materials are MOF-2 to 4, MOF-9, MOF-31 to 36, MOF-39, MOF-69 to 80, MOF103 to 106, MOF-122, MOF-125, MOF-150, MOF-177, MOF-178, MOF-235, MOF-236, MOF-500, MOF-501, MOF-502, MOF-505, IRMOF-1, IRMOF-61, IRMOP-13, IRMOP-51, MIL-17, MIL-45, MIL-47, MIL-53, MIL-59, MIL-60, MIL-61, MIL-63, MIL-68, MIL-79, MIL-80, MIL-83, MIL-85, CPL-1 to 2, SZL-1, which are described in the literature.

Particularly preferred metal-organic framework materials are Al-BDC, MOF-5, IRMOF-8, Cu-BTC, Al-NDC, Al-aminoBDC, Cu-BDC-TEDA, Zn-BDC-TEDA, Al-BTC, Al-NDC, Mg-NDC, Al fumarate, Zn 2-aminoimidazolate, Cu-biphenyldicarboxylate-TEDA, MOF-177, MOF-74. Even more preference is given to Al-BDC and Al-BTC.

Apart from the conventional method of preparing the MOFs, as is described, for example, in U.S. Pat. No. 5,648,508, these can also be prepared by an electrochemical route. With regard to this, reference is made to DE-A 103 55 087 and WO-A 2005/049892. The metal-organic framework materials prepared in this way have particularly good properties in respect of the adsorption and desorption of chemical substances, in particular gases.

Regardless of the method by which it is prepared, the metal-organic framework material is obtained in pulverulent or crystalline form. This can be used as such as sorbent in the process of the invention, either alone or together with other sorbents or other materials. It is preferably used as a loose material, in particular in a fixed bed. Furthermore, the metal-organic framework material can be converted into a shaped body. Preferred processes here are extrusion or tableting. In the production of shaped bodies, further materials such as binders, lubricants or other additives can be added to the metal-organic framework material. It is likewise conceivable for mixtures of framework material and other adsorbents such as activated carbon to be produced as shaped bodies or separately form shaped bodies which are then used as mixtures of shaped bodies.

The possible geometries of these shaped bodies are in principle not subject to any restrictions. For example, possible shapes are, inter alia, pellets such as disk-shaped pellets, pills, spheres, granules, extrudates such as rods, honeycombs, grids or hollow bodies.

To produce these shaped bodies, it is in principle possible to employ all suitable methods. In particular, the following processes are preferred:

Kneading of the framework material either alone or together with at least one binder and/or at least one pasting agent and/or at least one template compound to give a mixture; shaping of the resulting mixture by means of at least one suitable method such as extrusion; optionally washing and/or drying and/or calcination of the extrudate; optionally finishing treatment.

Application of the framework material to at least one optionally porous support material. The material obtained can then be processed further by the above-described method to give a shaped body.

Application of the framework material to at least one optionally porous substrate.

Kneading and shaping can be carried out by any suitable method, for example as described in Ullmanns Enzyklopädie der Technischen Chemie, 4th edition, volume 2, p. 313 ff. (1972), whose relevant contents are fully incorporated by reference into the present patent application.

For example, the kneading and/or shaping can preferably be carried out by means of a piston press, roller press in the presence or absence of at least one binder, compounding, pelletization, tableting, extrusion, coextrusion, foaming, spinning, coating, granulation, preferably spray granulation, spraying, spray drying or a combination of two or more of these methods.

Very particular preference is given to producing pellets and/or tablets.

The kneading and/or shaping can be carried out at elevated temperatures, for example in the range from room temperature to 300° C., and/or under superatmospheric pressure, for example in the range from atmospheric pressure to a few hundred bar, and/or in a protective gas atmosphere, for example in the presence of at least one noble gas, nitrogen or a mixture of two or more thereof.

The kneading and/or shaping is, in a further embodiment, carried out with addition of at least one binder, with the binder used basically being able to be any chemical compound which ensures the desired viscosity for the kneading and/or shaping of the composition to be kneaded and/or shaped. Accordingly, binders can, for the purposes of the present invention, be either viscosity-increasing or viscosity-reducing compounds.

Preferred binders are, for example, inter alia aluminum oxide or binders comprising aluminum oxide, as described, for example, in WO 94/29408, silicon dioxide as described, for example, in EP 0 592 050 A1, mixtures of silicon dioxide and aluminum oxide, as described, for example, in WO 94/13584, clay minerals as described, for example, in JP 03-037156 A, for example montmorillonite, kaolin, bentonite, hallosite, dickite, nacrite and anauxite, alkoxysilanes as described, for example, in EP 0 102 544 B1, for example tetraalkoxysilanes such as tetramethoxysilane, tetraethoxysilane, tetrapropoxysilane, tetrabutoxysilane, or, for example, trialkoxysilanes such as trimethoxysilane, triethoxysilane, tripropoxysilane, tributoxysilane, alkoxytitanates, for example tetraalkoxytitanates such as tetramethoxytitanate, tetraethoxytitanate, tetrapropoxytitanate, tetrabutoxytitanate, or, for example, trialkoxytitanates such as trimethoxytitanate, triethoxytitanate, tripropoxytitanate, tributoxytitanate, alkoxyzirconates, for example tetraalkoxyzirconates such as tetramethoxyzirconate, tetraethoxyzirconate, tetrapropoxyzirconate, tetrabutoxyzirconate, or, for example, trialkoxyzirconates such as trimethoxyzirconate, triethoxyzirconate, tripropoxyzirconate, tributoxyzirconate, silica sols, amphiphilic substances and/or graphites. Particular preference is given to graphite.

As viscosity-increasing compound, it is, for example, also possible to use, if appropriate in addition to the abovementioned compounds, an organic compound and/or a hydrophilic polymer such as cellulose or a cellulose derivative such as methylcellulose and/or a polyacrylate and/or a polymethacrylate and/or a polyvinyl alcohol and/or a polyvinylpyrrolidone and/or a polyisobutene and/or a polytetrahydrofuran.

As pasting agent, it is possible to use, inter alia, preferably water or at least one alcohol such as a monoalcohol having from 1 to 4 carbon atoms, for example methanol, ethanol, n-propanol, isopropanol, 1-butanol, 2-butanol, 2-methyl-1-propanol or 2-methyl-2-propanol or a mixture of water and at least one of the alcohols mentioned or a polyhydric alcohol such as a glycol, preferably a water-miscible polyhydric alcohol, either alone or as a mixture with water and/or at least one of the monohydric alcohols mentioned.

Further additives which can be used for kneading and/or shaping are, inter alia, amines or amine derivatives such as tetraalkylammonium compounds or amino alcohols and carbonate-comprising compounds such as calcium carbonate. Such further additives are described, for instance, in EP 0 389 041 A1, EP 0 200 260 A1 or WO 95/19222.

The order of the additives such as template compound, binder, pasting agent, viscosity-increasing substance during shaping and kneading is in principle not critical.

In a further, preferred embodiment, the shaped body obtained by kneading and/or shaping is subjected to at least one drying step which is generally carried out at a temperature in the range from 25 to 300° C., preferably in the range from 50 to 300° C. and particularly preferably in the range from 100 to 300° C. It is likewise possible to carry out drying under reduced pressure or under a protective gas atmosphere or by spray drying.

In a particularly preferred embodiment, at least one of the compounds added as additives is at least partly removed from the shaped body during this drying process.

The above-described porous metal-organic framework material is suitable as sorbent in a filter.

In the present use according to the invention, the porous metal-organic framework material must, in addition, comprise a coloring component.

In this case, in the context of the present invention, a coloring component is taken to mean a component which imparts a color to the metal-organic framework material by corresponding adsorption of wavelengths of the visible light spectrum.

This can be achieved by various components, wherein, of course, although one coloring component may be sufficient, a plurality of coloring components can also be present which together are responsible for the coloring of the metal-organic framework material.

Firstly, the at least one metal ion can be the coloring component.

In this case the at least one metal ion participates in the structure of the framework of the porous metal-organic framework material.

If the porous metal-organic framework material is only made up of metal ions of one metal, this is responsible for the coloring. In this case, use is made of metal ions which have an appropriate color.

Suitable metal ions are transition metal ions such as $Fe^{II}$, $Fe_{III}$, $Co^{II}$, $Co^{III}$, $Ni^{II}$, $Mo^{V}$, $Mo^{III}$, $Cr^{III}$, $Cr^{VI}$, $V^{III}$, $V^{IV}$, $V^{V}$, $Mn^{III}$ or $Mn^{VII}$.

However, in addition metal ions of a plurality of different metals or metal ions of one metal having different oxidation states can also participate in the structure of the framework of the porous metal-organic framework material. In this case, all metal ions can act as coloring components. However, preferably only one of the different metal ions is the coloring component. In this case it is particularly preferred that the porous metal-organic framework material is a doped framework material, the doping metal being the coloring component. Processes for production of such doped metal-organic framework materials are described in the European patent application having the application number 06123650.1. In this case, in the examples, reference is made to framework materials which comprise aluminum as framework-forming metal and molybdenum as doping metal. Such doped metal-organic framework materials have a coloring such that owing to the molybdenum a coloring component is present in the metal-organic framework material.

Metals suitable as doping metal having a coloring property are those as are listed above. In addition, the framework-forming metal can be taken from the above generally described selection of metals for the structure of a porous metal-organic framework material.

In addition to, or as an alternative thereto, the at least one at least bidentate organic compound which likewise participates in the framework structure of the porous metal-organic framework material can be the coloring component.

In this case, the at least one bidentate organic compound must possess, beyond its suitability as framework-forming component, a coloring chromophore also. If only one at least bidentate organic compound participates in the structure of the framework material, it is the coloring component. If a plurality of at least bidentate organic compounds are used for the structure of the metal-organic framework material, all or only some of these compounds can in addition act as coloring component.

Typical chromophore radicals are in this case, for example, the nitroso group —N=O, the azo group —N=N—, the carbonyl group C=O, the thiocarbonyl group C=S and the azomethine group C=N— and also extended aromatic systems.

Such groups can be correspondingly introduced into the abovementioned at least bidentate organic compounds which are suitable for the structure of the metal-organic framework material. In this case the above-described preferences for at least bidentate organic compounds apply mutatis mutandis.

A particularly preferred coloring, at least bidentate, organic compound is aminoterephthalic acid which forms a lattice isostructural to framework materials based on terephthalic acid and is therefore readily miscible.

In addition to, or as an alternative thereto, the metal-organic framework material can likewise comprise a further component which is coloring. This further component can be of inorganic or organic nature. If it is an organic compound, it can, in addition, also have an inorganic part, such as, for example, a metal. This additional compound, however, is neither the at least one metal ion, nor the at least one at least bidentate organic compound. Obviously, such a compound or a plurality of such compounds can be present in the metal-organic framework material. These can be bound by adsorption or coordination to the porous metal-organic framework material, wherein, in the case of a coordinate bond, this additional compound does not contribute to the framework structure.

In this case the compound can be in particular an inorganic colored, white or black pigment, or an organic pigment which has at least in part an organic dye.

This further component, by simple contacting with the porous metal-organic framework material, can bind to it by adsorption or coordination. Examples of such framework materials are described by H. K. Chae et al., Nature 427 (2004), 523-527.

The organic pigments (dyes) are customarily organic colored, white and black pigments (color pigments). Inorganic pigments can likewise be color pigments and also luster pigments and the inorganic pigments customarily used as fillers.

Examples of these are anthanthrone, anthraquinone, anthrapyrimidine, azo, quinacridone, quinophthalone, diketopyrrolopyrrole, dioxazine, flavanthrone, indanthrone, isoindoline, isoindolinone, isoviolanthrone, metal complex, perinone, perylene, phthalocyanine, pyranthrone, pyrazoloquinazolone, thioindigo and triarylcarbonium pigments.

Hereinafter, mention may be made in particular of the following as examples of suitable organic color pigments:

monoazo pigments: C. I. Pigment Brown 25; C. I. Pigment Orange 5, 13, 36, 38, 64 and 67; C. I. Pigment Red 1, 2, 3, 4, 5, 8, 9, 12, 17, 22, 23, 31, 48:1, 48:2, 48:3, 48:4, 49, 49:1, 51:1, 52:1, 52:2, 53, 53:1, 53:3, 57:1, 58:2, 58:4, 63, 112, 146, 148, 170, 175, 184, 185, 187, 191:1, 208, 210, 245, 247 and 251; C. I. Pigment Yellow 1, 3, 62, 65, 73, 74, 97, 120, 151, 154, 168, 181, 183 and 191; C. I. Pigment Violet 32;

disazo pigments: C. I. Pigment Orange 16, 34, 44 and 72; C. I. Pigment Yellow 12, 13, 14, 16, 17, 81, 83, 106, 113, 126, 127, 155, 174, 176 and 188;

disazo condensation pigments: C. I. Pigment Yellow 93, 95 and 128; C. I. Pigment Red 144, 166, 214, 220, 221, 242 and 262; C. I. Pigment Brown 23 and 41;

anthanthrone pigments: C. I. Pigment Red 168;

anthraquinone pigments: C. I. Pigment Yellow 147, 177 and 199; C. I. Pigment Violet 31;

anthrapyrimidine pigments: C. I. Pigment Yellow 108;

quinacridone pigments: C. I. Pigment Orange 48 and 49; C. I. Pigment Red 122, 202, 206 and 209; C. I. Pigment Violet 19;

quinophthalone pigments: C. I. Pigment Yellow 138;

diketopyrrolopyrrole pigments: C. I. Pigment Orange 71, 73 and 81; C. I. Pigment Red 254, 255, 264, 270 and 272;

dioxazine pigments: C. I. Pigment Violet 23 and 37; C. I. Pigment Blue 80;

flavanthrone pigments: C. I. Pigment Yellow 24;

indanthrone pigments: C. I. Pigment Blue 60 and 64;

isoindoline pigments: C. I. Pigment Orange 61 and 69; C. I. Pigment Red 260; C. I. Pigment Yellow 139 and 185;

isoindolinone pigments: C. I. Pigment Yellow 109, 110 and 173;

isoviolanthrone pigments: C. I. Pigment Violet 31;

metal complex pigments: C. I. Pigment Red 257; C. I. Pigment Yellow 117, 129, 150, 153 and 177; C. I. Pigment Green 8;

perinone pigments: C. I. Pigment Orange 43; C. I. Pigment Red 194;

perylene pigments: C. I. Pigment Black 31 and 32; C. I. Pigment Red 123, 149, 178, 179, 190 and 224; C. I. Pigment Violet 29;

phthalocyanine pigments: C. I. Pigment Blue 15, 15:1, 15:2, 15:3, 15:4, 15:6 and 16; C. I. Pigment Green 7 and 36;

pyranthrone pigments: C. I. Pigment Orange 51; C. I. Pigment Red 216;

pyrazoloquinazolone pigments: C. I. Pigment Orange 67; C. I. Pigment Red 251;

thioindigo pigments: C. I. Pigment Red 88 and 181; C. I. Pigment Violet 38;

triarylcarbonium pigments: C. I. Pigment Blue 1, 61 and 62; C. I. Pigment Green 1; C. I. Pigment Red 81, 81:1 and 169; C. I. Pigment Violet 1, 2, 3 and 27;

C. I. Pigment Black 1 (aniline black);

C. I. Pigment Yellow 101 (aldazine yellow);

C. I. Pigment Brown 22.

Suitable inorganic color pigments are white pigments: titanium dioxide (C. I. Pigment White 6), zinc white, colored zinc oxide;

zinc sulfide;

lithopones;

black pigments: iron oxide black (C. I. Pigment Black 11), iron manganese black, spinet black (C. I. Pigment Black 27); carbon black (C. I. Pigment Black 7);

color pigments: chromium oxide, chromium oxide hydrate green; chrome green (C. I. Pigment Green 48); cobalt green (C. I. Pigment Green 50); ultramarine green; cobalt blue (C. I. Pigment Blue 28 and 36; C. I. Pigment Blue 72); ultramarine blue; manganese blue; ultramarine violet; cobalt and manganese violet; iron oxide red (C. I. Pigment Red 101); cadmium sulfoselenide (C. I. Pigment Red 108); cerium sulfide (C. I. Pigment Red 265); molybdate red (C. I. Pigment Red 104); ultramarine red; iron oxide brown (C. I. Pigment Brown 6 and 7), mixed brown, spinel and corundum phases (C. I. Pigment Brown 29, 31, 33, 34, 35, 37, 39 and 40), chromium titanium yellow (C. I. Pigment Brown 24), chrome orange; cerium sulfide (C. I. Pigment Orange 75); iron oxide yellow (C. I. Pigment Yellow 42); nickel titanium yellow (C. I. Pigment Yellow 53; C. I. Pigment Yellow 157, 158, 159, 160, 161, 162, 163, 164 and 189); chromium titanium yellow; spinel phases (C. I. Pigment Yellow 119); cadmium sulfide and cadmium zinc sulfide (C. I. Pigment Yellow 37 and 35); chrome yellow (C. I. Pigment Yellow 34); bismuth vanadate (C. I. Pigment Yellow 184).

In particular in the case of filters in the medical use sector and comestibles used for the pleasure sector, natural or nature-identical dyes, for example carotenoids, are also of interest.

The filter is preferably an air filter or exhaust air filter.

The shape and nature of the filter can be selected as desired and matched to the corresponding use. Usable filter systems are known to those skilled in the art. A plastic bag can serve as a simple example of a filter which has pores or small holes and is gas permeable, which is filled with the MOF material, preferably as shaped body. Likewise, familiar air or exhaust air filters can be used. Use can also be made of filters as are used in steam extraction hoods, air conditioning systems, circulation units, exhaust systems, vacuum cleaners, but also in industrial plants. The MOF material can also be charged into cartridges, preferably having a cylindrical shape, which are closed at the end with a porous gas-permeable material and through which the medium to be cleaned can flow. The material used for packaging should preferably be thermally stable so that the filter or the filter unit can be cleaned, for example for recycling, for example by thermal desorption. Glass, metal such as, for example, aluminum, or plastics known to those skilled in the art such as poly(vinyl chloride), polystyrene, poly(methyl methacrylate), polycarbonate, polyvinylpyrrolidone, poly(ether sulfone), polyester, epoxy resins, polyacetal, etc. are suitable for this purpose. The MOF material is suitable for passive use (contact with the gas by convection or preexisting streams) and for active use (contact with the gas intensified by pumping, pressure differences, etc.). It can be used for pretreating the interior air in means of transport such as motor vehicles, aircraft, trains, ships, but also in exhaust air filters in internal combustion engines, electrical and electronic equipment. Likewise, it is used for air purification in office, living and storage rooms, gas masks, shelters, steam extraction hoods, in nuclear plants, for example for radioactive substances, vessels, containers, refrigerators, motor vehicles, etc., and also in rubber semi-manufactured goods, smoking materials and finished components.

Filters which are of particular interest are those for steam extraction hoods, air conditioning systems, exhaust systems, vacuum cleaners, the interior of rooms, vessels, containers, equipment or means of transport, gas masks and smoking materials.

Preferably, the filter can be regenerated. This is possible in principle, since the adsorption of the odor substance to the MOF material is reversible. Thus, for example, by temperature elevation or pressure reduction, desorption can proceed. Also, the odor substance can be displaced into purge gas. The manner in which desorption can be carried out is known to those skilled in the art. Instructions on this may be found, for example, in Werner Kast, "Adsorption aus der Gasphase" [Adsorption from the gas phase], Verlag V C H, Weinheim, 1988.

EXAMPLES

1st Example

Production of an Al-BTC-MOF with an Orange Color 5 g of $AlCl_3.6H_2O$, 1.41 g of $MoCl_5$ and 3.99 g of trimesic acid are suspended in 300 ml of DMF in a glass flask, heated to 130° C. and stirred under reflux for 17 h under these conditions. The product produced is filtered off and washed with 3×50 ml of DMF and also 4×50 ml of methanol. Subsequently the product is predried for 24 h in a vacuum drying cabinet at 200° C. and subsequently calcined in air in a muffle furnace for 48 h at 330° C.

An orange-brown material having a Langmuir $N_2$ surface area of 1754 m²/g is obtained. According to elemental analysis, the material comprises 37.6% by weight C, 2.1% by weight H, 12.6% by weight Al and 1.1% by weight Mo.

A corresponding filter material which comprises this metal-organic framework material has a corresponding color.

2nd Example

Production of an Al-BDC-MOF with a Yellow Color 5 g of $AlCl_3.6H_2O$, 1.89 g of $MoCl_5$ and 8.72 g of terephthalic acid are suspended in 300 ml of DMF in a glass flask, heated to 130° C. and stirred under reflux for 17 h under these conditions. The product produced is filtered off and washed with 3×50 ml of DMF and also 3×50 ml of methanol. Subsequently, the product is predried in a vacuum drying cabinet for 24 h at 150° C. and subsequently calcined in air in a muffle furnace for 48 h at 330° C.

3.62 g of a yellow material having a Langmuir $N_2$ surface area of 1528 m²/g are obtained. According to elemental analysis, the material comprises 44.3% by weight C, 2.7% by weight hydrogen, 12.0% by weight Al and 0.65% by weight Mo. According to XRD, this is a MIL-53 structure, the same basic structure which would have been formed under these reaction conditions even without the presence of Mo.

A corresponding filter material which comprises this metal-organic framework material has a corresponding color.

3rd Example

Production of a Subsequently Dyed MOF Structure

A β-carotene-containing formulation (0.5 g of Lucarotin 10 CWD/O, BASF AG, Ludwigshafen, Germany) is stirred in 50 ml of water. To this are added 2 g of an Al-terephthalate-MOF (according to WO 2007/023134, Example 26, but uncalcined; $N_2$-surface area 598 m²/g according to Langmuir) to the colloidal solution. After a short exposure time of 5 minutes, the product is filtered off and rinsed with 3×50 ml of methanol. Finally, the product is dried at 100° C. for 16 h in a vacuum drying cabinet. The product is an orange powder having an $N_2$-surface area of 607 m²/g (according to Langmuir). The XRD indicates that the MOF framework is still intact after the treatment.

4th Example

Production of an MOF Structure Colored Light Yellow 9.74 g of $AlCl_3$, 1.36 g of aminoterephthalic acid and 11.24 g of terephthalic acid are suspended in 600 ml of DMF in a 1 l flask and kept at 130° C. under reflux with stirring for 24 h. After the mixture has cooled, the precipitated MOF is filtered off, rinsed with 3×50 ml of methanol and post-treated for 16 h under reflux with methanol in a Soxhlet extractor. Finally, the product is dried in a vacuum drying cabinet at 110° C. for 16 h. 8.1 g of a light yellow powder are obtained. The XRD indicates that the MOF formed has the MIL-53 structure, which must have formed under these conditions even without

The invention claimed is:

1. A method of producing a filter, comprising shaping a porous metal-organic framework material comprising at least one at least bidentate organic compound coordinated to at least one metal ion into a body, wherein the framework material further comprises a coloring component, wherein said coloring component is an inorganic colored pigment, wherein the pigment is s colored zinc oxide, zinc sulfide, lithopones, iron oxide black (C. I. Pigment Black 11), iron manganese black, spinel black (C. I. Pigment Black 27), carbon black (C. I. Pigment Black 7), chromium oxide, chromium oxide hydrate green, chrome green (C. I. Pigment Green 48), cobalt green (C. I. Pigment Green 50), ultramarine green, cobalt blue (C. I. Pigment Blue 28 and 36; C. I. Pigment Blue 72), ultramarine blue, manganese blue, ultramarine violet, cobalt and manganese violet, iron oxide red (C. I. Pigment Red 101), cadmium sulfoselenide (C. I. Pigment Red 108), cerium sulfide (C. I. Pigment Red 265), molybdate red (C. I. Pigment Red 104), ultramarine red, iron oxide brown (C. I. Pigment Brown 6 and 7), mixed brown, spinel and corundum phases (C. I. Pigment Brown 29, 31, 33, 34, 35, 37, 39 and 40), chromium titanium yellow (C. I. Pigment Brown 24), chrome orange, cerium sulfide (C. I. Pigment Orange 75), iron oxide yellow (C. I. Pigment Yellow 42), nickel titanium yellow (C. I. Pigment Yellow 53; C. I. Pigment Yellow 157, 158, 159, 160, 161, 162, 163, 164 and 189), chromium titanium yellow, spinel phases (C. I. Pigment Yellow 119), cadmium sulfide and cadmium zinc sulfide (C. I. Pigment Yellow 37 and 35), chrome yellow (C. I. Pigment Yellow 34) or bismuth vanadate (C. I. Pigment Yellow 184).

2. The method according to claim 1, wherein the filter is an air filter or exhaust air filter.

3. The method according to claim 1, wherein the filter is a filter for a steam extraction hood, an air conditioning system, an exhaust system, a vacuum cleaner, an interior of room, a vessel, a container, an equipment or means of transport, a gas mask and a smoking material.

4. The method according to claim 1, wherein the porous metal-organic framework material comprises micropores and/or mesopores.

5. The method according to claim 1, wherein the specific surface area of the porous metal-organic framework, calculated from the Langmuir model (DIN 66131, 66134) for an metal-organic framework in powder form is greater than 5 m$^2$/g.

6. The method according to claim 1, wherein the metal in the porous metal-organic framework is one or more of Zn, Cu, Al, V, Mn, Ln, Y, Sc, Mg, Zr, Ti, Fe, Co, Ni, In, Ga, and Ca.

7. The method according to claim 1, wherein the metal in the porous metal-organic framework is one or more of Al, Zn, Cu, and Zr.

8. A filter comprising a porous metal-organic framework material comprising at least one at least bidentate organic compound coordinated to at least one metal ion, wherein the framework material further comprises a coloring component, wherein said coloring component is an inorganic colored pigment, wherein the pigment is s colored zinc oxide, zinc sulfide, lithopones, iron oxide black (C. I. Pigment Black 11), iron manganese black, spinel black (C. I. Pigment Black 27), carbon black (C. I. Pigment Black 7), chromium oxide, chromium oxide hydrate green, chrome green (C. I. Pigment Green 48), cobalt green (C. I. Pigment Green 50), ultramarine green, cobalt blue (C. I. Pigment Blue 28 and 36; C. I. Pigment Blue 72), ultramarine blue, manganese blue, ultramarine violet, cobalt and manganese violet, iron oxide red (C. I. Pigment Red 101), cadmium sulfoselenide (C. I. Pigment Red 108), cerium sulfide (C. I. Pigment Red 265), molybdate red (C. I. Pigment Red 104), ultramarine red, iron oxide brown (C. I. Pigment Brown 6 and 7), mixed brown, spinel and corundum phases (C. I. Pigment Brown 29, 31, 33, 34, 35, 37, 39 and 40), chromium titanium yellow (C. I. Pigment Brown 24), chrome orange, cerium sulfide (C. I. Pigment Orange 75), iron oxide yellow (C. I. Pigment Yellow 42), nickel titanium yellow (C. I. Pigment Yellow 53; C. I. Pigment Yellow 157, 158, 159, 160, 161, 162, 163, 164 and 189), chromium titanium yellow, spinel phases (C. I. Pigment Yellow 119), cadmium sulfide and cadmium zinc sulfide (C. I. Pigment Yellow 37 and 35), chrome yellow (C. I. Pigment Yellow 34) or bismuth vanadate (C. I. Pigment Yellow 184).

9. The filter according to claim 8, which is an air filter or exhaust air filter.

10. The filter according to claim 8, which is a filter for a steam extraction hood, an air conditioning system, an exhaust system, a vacuum cleaner, an interior of room, a vessel, a container, an equipment or means of transport, a gas mask and a smoking material.

11. The filter according to claim 8, wherein the porous metal-organic framework material comprises micropores and/or mesopores.

12. The filter according to claim 8, wherein the specific surface area of the porous metal-organic framework, calculated from the Langmuir model (DIN 66131, 66134) for an metal-organic framework in powder form is greater than 5 m$^2$/g.

13. The filter according to claim 8, wherein the metal in the porous metal-organic framework is one or more of Zn, Cu, Al, V, Mn, Ln, Y, Sc, Mg, Zr, Ti, Fe, Co, Ni, In, Ga, and Ca.

14. The filter according to claim 8, wherein the metal in the porous metal-organic framework is one or more of Al, Zn, Cu, and Zr.

* * * * *